No. 12,542. REISSUED OCT. 23, 1906.

W. S. BARKER.

CONCRETE BLOCK MACHINE.

APPLICATION FILED AUG. 20, 1906.

2 SHEETS—SHEET 1.

WITNESSES

M E Kirk

Hazel Kirk

INVENTOR

William S Barker

By Geo E Kirk

ATTORNEY

No. 12,542. REISSUED OCT. 23, 1906.
W. S. BARKER.
CONCRETE BLOCK MACHINE.
APPLICATION FILED AUG. 20, 1906.
2 SHEETS—SHEET 2.
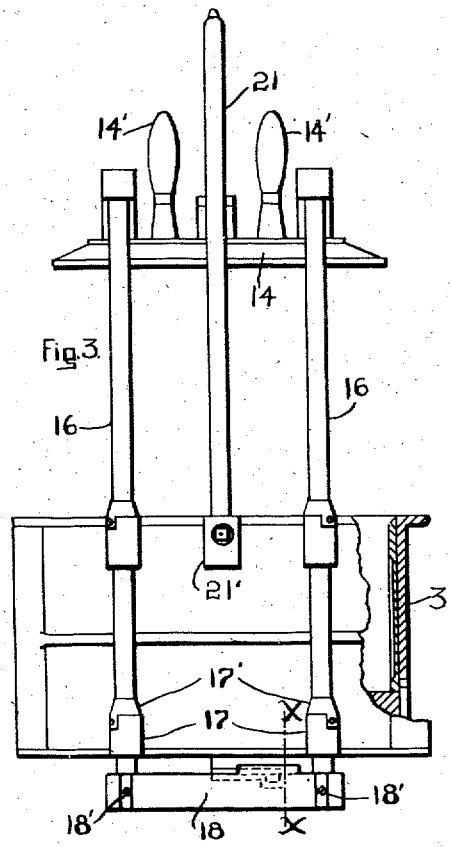
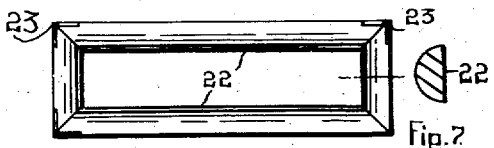
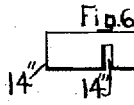
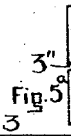
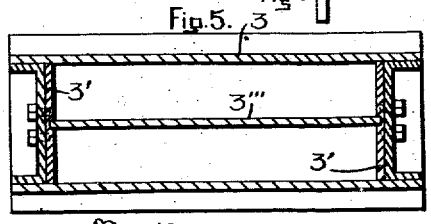
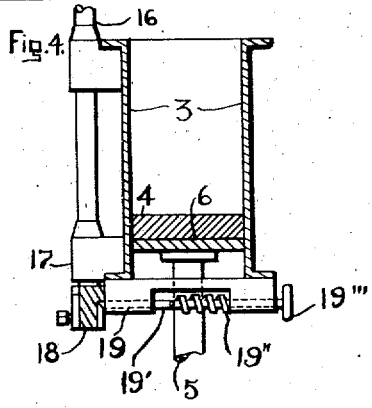
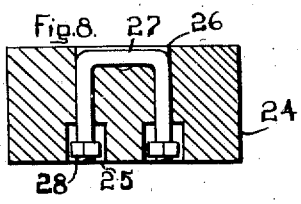
WITNESSES
M E Kirk
Hazel Kirk
INVENTOR
William S Barker
By Geo E Kirk
ATTORNEY

UNITED STATES PATENT OFFICE.

WILLIAM S. BARKER, OF TOLEDO, OHIO.

CONCRETE-BLOCK MACHINE.

No. 12,542. Specification of Reissued Letters Patent. Reissued Oct. 23, 1906.

Original No. 800,200, dated September 26, 1905. Application for reissue filed August 20, 1906. Serial No. 331,377.

*To all whom it may concern:*

Be it known that I, WILLIAM S. BARKER, a citizen of the United States, residing at Toledo, in the county of Lucas and State of Ohio, have invented certain new and useful Improvements in Concrete-Block Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in concrete-block-building machines.

The object of the invention is to provide a machine with a greatly-increased capacity for making building-blocks of the above type of various sizes and for tamping the face of the block with the face upward, any desired face-surface being possible.

The machine has the following advantages: A coarser and wetter grouting may be used for the body of the block, and owing to the face of the block being tamped a finer material in a somewhat drier condition than the grouting may be used to form the face. In other words, the material of the face may possess a sufficient dryness that will prevent it from sticking to the face or tamping plate. The block being only four inches high and six by sixteen inches in the face, the block will stand up upon the pallet in a very wet condition, which is desirable. Because of the face being upward and the tamping thereof being performed by a repetition of impacts the face of the block becomes very dense and hard. It may be further stated that the capacity of the machine is greatly increased, owing to the simplicity of its operation.

Preceding a detailed description of the invention, reference is made to the accompanying drawings, of which—

Figure 1:
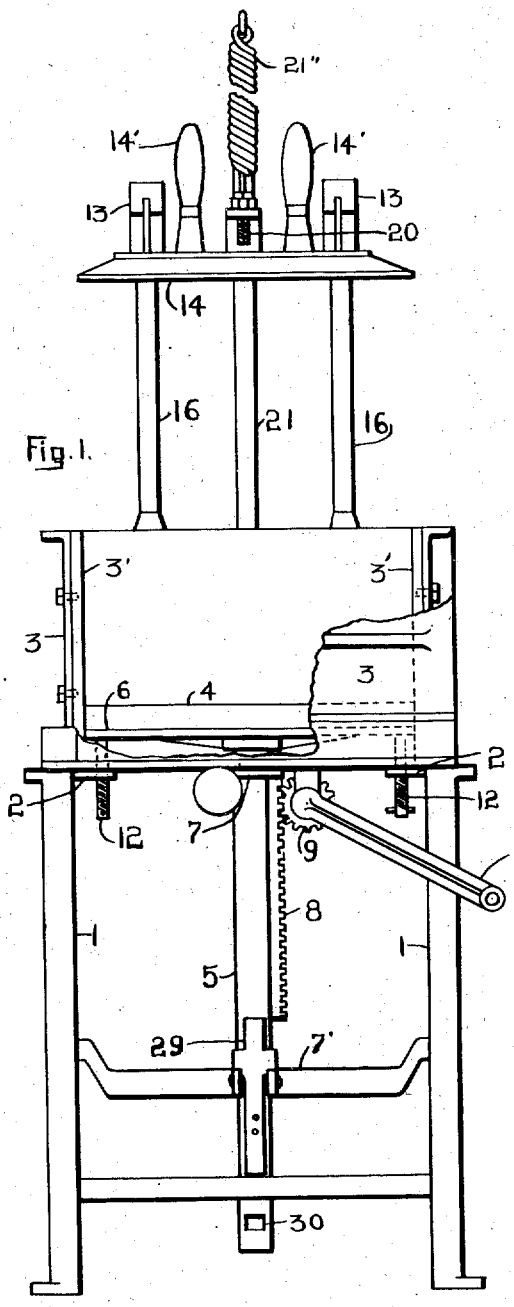
Figure 2:
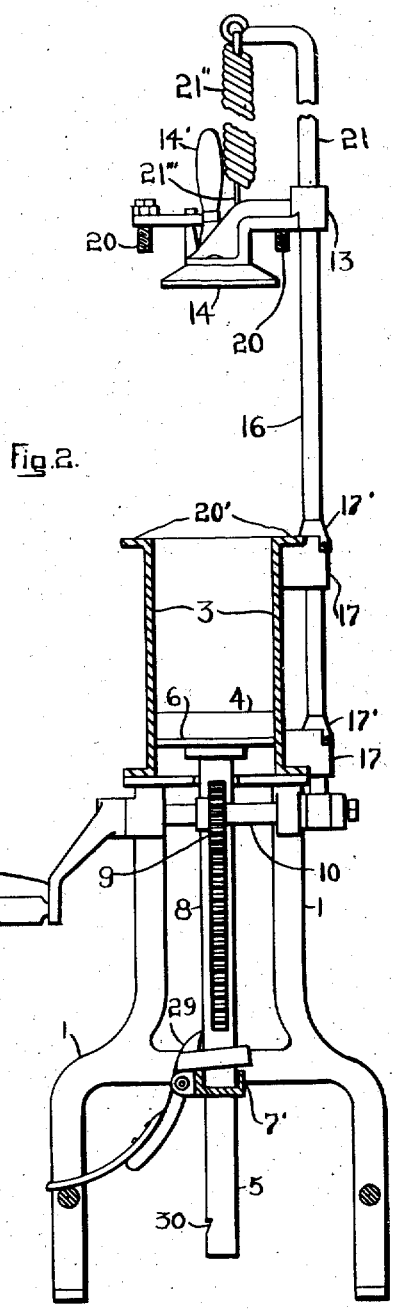

Figure 1 is a front elevation of the machine, showing the tamping face-plate elevated and the front wall of the mold-box broken away. Fig. 2 is a side elevation with the mold-box shown in section and the tamping face-plate elevated. Fig. 3 is a rear view of the mold-box, as shown in Fig. 1, with the tamping face-plate elevated. Fig. 4 is a side sectional view of the mold-box on the line $x$ $x$ of Fig. 3 and portions of the guides of the tamping face-plate. Fig. 5 is a horizontal sectional plan view of the mold-box, showing the same adapted for the making of two building-blocks in one operation. Fig. 5[a] is a detail of a feature shown in Fig. 5. Fig. 6 is a detail of a tamping-plate used with features shown in Fig. 5, showing an end view of same. Fig. 7 is a detail view of means for constructing ventilating-channels in the outer surface of the block. Fig. 8 is a detail sectional view of a core employed in the construction of a hollow block.

Throughout the specification similar reference characters indicate corresponding parts.

1 designates the parts of the framework which support the mold-box 3, in which the concrete-blocks are formed. 4 is the movable bottom or pallet of said mold-box, which is centrally supported on a vertically-movable standard 5, with intervening plate 6. The standard 5 is guided in its movements by means of a suitable collar 7, which is secured to the under side of the mold-box, and at its lower end it is guided by passing through a bar 7′, which connects the lower portions of the frame. One side of the standard 5 is provided with a rack 8, which is engaged by a pinion 9 on shaft 10, the latter being operated by a crank 11 to raise and lower the pallet 4. The lower position of the pallet is adjusted for different widths of blocks by means of adjusting-screws 12, which penetrate ears 2 and make contact with the under side of the base-plate 6, which lies below and supports the pallet.

14 designates the face or tamping plate, which forms the outer or exposed surface of the block and which may be of any suitable surface, design, or configuration—for example, rock face, stone face, &c. This tamping or face plate is provided with two apertured lugs 13, through which pass guide-rods 16 and which are made fast to said rods. These guide-rods are supported at the rear of the mold-box in apertured lugs 17, which project from the rear side of said mold-box, said lugs 17 having secured to their upper ends apertured cones 17′, which also receive said guide-rods. The rods 16 move in said lugs and cones in the operations of tamping. The purpose of these cones 17′ is to act as a cap or means for preventing the dirt from entering the apertured bosses 17, through which the rods move in the operations of the tamping-plate. The lower ends of said guide-rods are connected with a cross-bar 18 in the form of an angle in cross-section, as shown in Fig. 4, the connections of said guide-rods with said cross-bar being by means of screws 18′.

Secured to the bottom of the mold-box in a central position relatively thereto and cross-wise thereof is an apertured cross-piece 19, which receives a bolt 19′. The rear end of this bolt is tapered in the form of a latch and lies in a position to engage the cross-bar 18, as shown in Fig. 4, to hold the guide-rods 16 and therewith the tamping face-plate in an elevated position. The bolt 19′ is maintained in an engaging position by means of a coil-spring 19″, and the outer end of said bolt is provided with a finger-piece 19‴, by which the bolt is drawn outward to release the cross-bar 18 and to permit the guide-rods 16 and therewith the tamping face-plate to descend to their lower or operative position. In elevating the said guide-rods and therewith the tamping face-plate after the operation of tamping each block the cross-bar 18 engages the end of the bolt 19′ and pushes said bolt outwardly, after which said bolt engages the lower side of said bar and maintains the tamping-plate in an elevated position in a manner that will be readily understood.

The tamping face-plate 14 is provided with two handles 14′, by which the tamping operations are performed, and the position of the face-plate with reference to the depth of its movement in the tamping operations within the mold-box is regulated by adjusting-screws 20, which are regulated with reference to the upper ledges 20′ of the mold-box.

21 designates an arm fixed to the rear side of the mold-box by projecting into an apertured lug 21′ and fixed therein by means of a set-screw. This arm supports at its upper end a retractile spring 21″. This spring is connected to a projection 21‴ on the upper side of the tamping face-plate 14.

The mold-box 3 has two removable end plates 3′, which are used in the construction of ordinary blocks—for example, those blocks which lie between the corners of a structure. As shown in Figs. 5 and 5ª, said end plates may be provided with grooves 3″ on one side. In the event that a single block is made in the mold-box the end plates 3′ are placed therein with the grooves 3″ on the outside. It may be stated that in the manufacture of two blocks within a single mold a division-plate 3‴ may be used, as shown in Fig. 5, in which event the end plates 3′ are placed with the grooves 3″ on the inside to receive the division-plate 3‴.

By means of the frame shown in Fig. 7 a building-block having ventilating-grooves around its sides in the middle portion thereof may be obtained. This consists of an oblong rectangular frame consisting of side and end pieces 22, which are hinged at 23 at three corners. As shown in the cross-sectional view, the side and end pieces are half-oval, the rounded portion lying inwardly and forming a core around the middle portion of the block. In practice this frame occupies a middle position in the core-box 3. The necessary amount of grouting is first placed in the mold-box and then the frame (shown in Fig. 7) is placed in position within the mold and the remaining portion of the mold is filled with grouting to a point where the facing material is placed in position. The core-frame is removed after the block has been elevated upon the pallet 4 above the mold. This removal of the mold-block from the mold-box is enabled by a sufficient turn of the pinion-lever 11. It may be stated here that in molding two building-blocks at one time by means of the partition or division plate 3‴ a tamping face-plate 14″ is used which has two face impressions thereon instead of one in order that the two separate face impressions may be given to the face of the building-block. The face-plate in this case has a groove 14‴, Fig. 6, to straddle the edge of wall 3‴. In molding a hollow block the core 24 (shown in Fig. 8) is employed. This core is of sufficient dimensions to allow a suitable amount of the material to enter around the sides of said core. As shown, the core is provided with open spaces 25 in the lower portion thereof, extending from which is an opening 26 of smaller diameter and opening through the top of the core. Within this space or opening 26 is placed a metallic handle 27, the lower ends of which extend into the larger openings 25 and are fitted with heads or nuts 28, which act to prevent the handle 27 from pulling out of the core when said handle is grasped by the hand in removing the core from the block. It is highly desirable that the handle 27 engage the lower portion of the core in lifting said core from the block for the reason that if the engagement between the handle and the core be at a higher point in the core there will be great danger of the molded block being damaged in the removal of the core. The upper portion of the handle 27 is accessible to the hand, owing to the top of the core being recessed out. The pallet 4 is held up with the molded block thereon in a position for the removal of said block by a dog 29, which enters a notch 30 in the lower end of the standard 5. The tamping or face plate 14 is maintained in a true position to the mold, and each impact of said face-plate is identically in the same position.

Having described my invention, I claim—

1. A mold provided with a tamping-plate and a retaining device to hold the plate inoperative.

2. A mold-box, guide-rods, a tamping-plate guided by the rods and a retaining device to hold the plate withdrawn from the box.

3. In a concrete-block machine, a mold-box, a face-plate for tamping the face-surface of the block, rods attached to the rear side of said face-plate and in guide-sockets in the rear of the mold-box, and retaining devices to hold the face-plate in an elevated position.

4. In a concrete-block machine, a mold-box, a face-plate for tamping the face-surface of the block, rods attached to the rear side of said face-plate and supported in guide-sockets in the rear of the mold-box, a transverse bar to which the lower ends of said rods are connected, and retaining devices below the mold-box and coöperating with said transverse bar to hold the face-plate in an elevated position.

5. In a concrete-block machine, a mold-box having interior end plates with reversible working sides, a face-plate for tamping the face-surface of the block, handles attached to said face-plate, rods to the upper ends of which the face-plate is attached, guide-lugs on the rear of the mold-box through which said rods project, a cross-bar connecting the lower ends of said bars and lying parallel with the mold-box and therebelow, a latch lying transversely of the mold-box and therebelow and engaging said cross-bar to hold the face-plate in an elevated position.

6. In a concrete-block machine, a frame, a stationary mold-box mounted thereon, a pallet forming the bottom of said mold-box, a standard upon which said pallet is supported, said standard having a rack attached to one side thereof, a handled pinion engaging said rack whereby the pallet is raised and lowered, means engaging the lower portion of the standard to hold the pallet in its elevated position, a face-plate for tamping the surface of the block, rods upon the upper portion of which said face-plate is supported, a transverse bar to which said rods at the lower ends are attached, and a latch mounted below the mold-box and engaging said bar to hold the tamping-plate in its elevated position.

7. In a concrete-block machine, a core for forming a hollow block, said core having vertical openings 26 joined at the upper surface of the core by a horizontal channel which is exposed at the surface of the core, the lower portions of said openings terminating in enlarged openings 25 and forming shoulders, a bail or handle 27 projected through said openings 26, and the lower ends of said bail or handle lying within the openings 25, heads on said lower ends engaging with the shoulders formed by said openings 25 whereby the bail or handle 27 is caused to engage the core at points in the lower portion of said core, substantially as and for the purposes specified.

8. In a concrete-block machine, a mold-box, a movable pallet-frame, the bottom of said core-box, a face-plate constituting the tamping-plate, rods to the upper ends of which said face-plate is rigidly attached, a cross-bar attached to the lower ends of said rods, said cross-bar lying parallel with the mold-box and therebelow, a latch lying transversely of the mold-box and therebelow and engaging with said cross-bar to hold the tamping-plate in its elevated position, a spring attached to said tamping-plate and serving to facilitate the tamping operations thereof, and an arm projected from the rear side of the mold-box and to which said spring is attached, substantially as set forth.

In testimony whereof I affix my signature in presence of two witnesses.

WILLIAM S. BARKER.

Witnesses:
GERTRUDE A. DELANEY,
GEO. E. KIRK.